C. P. JANES.

Atomizer.

No. 6,345. Reissued March 23, 1875.

Witnesses.
S. N. Pepper
L. N. Billes

Charles P. Janes.
by his attorney.
R. H. Eddy

UNITED STATES PATENT OFFICE.

CHARLES P. JANES, OF BOSTON, ASSIGNOR, BY MESNE ASSIGNMENTS, TO WILLIAM D. ATKINSON, JR., OF LYNN, MASSACHUSETTS.

IMPROVEMENT IN ATOMIZERS.

Specification forming part of Letters Patent No. 115,615, dated June 6, 1871; reissue No. 6,345, dated March 23, 1875; application filed February 3, 1875.

*To all whom it may concern:*

Be it known that I, CHARLES P. JANES, of Boston, of the county of Suffolk and State of Massachusetts, have invented an Improved Atomizer; and do hereby declare the same to be fully described in the following specification and represented in the accompanying drawings, of which—

Figure 1:
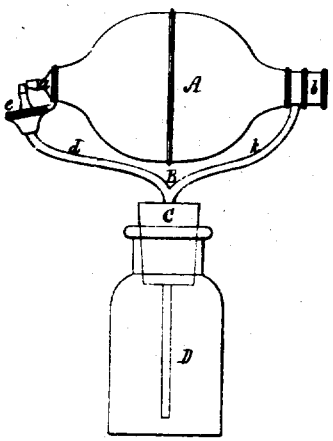
Figure 2:
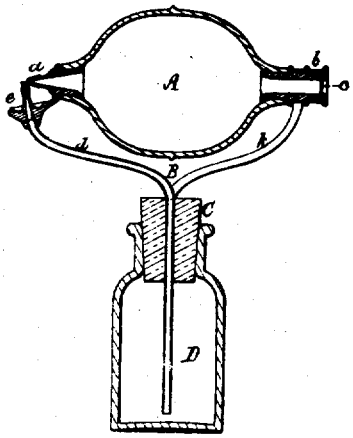
Figure 3:
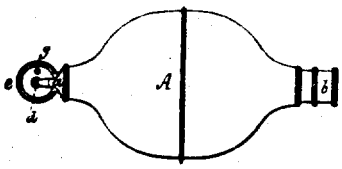
Figure 4:
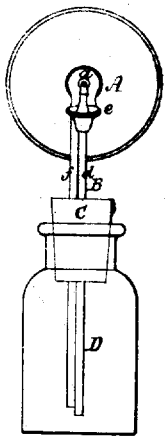

Figure 1 is a front elevation; Fig. 2, a vertical section; Fig. 3, a top view; and Fig. 4 an end elevation of it.

In such drawings, A denotes an elastic-bulb air-syringe, arranged in and supported by a furcated standard, B, extended down through a cork, C, of a bottle, D. At one end the syringe has a jet-nozzle, *a*, and at the other it is provided with a valve-case, *b*, containing a disk-valve, *c*, the whole being so that when the bulb, after being collapsed or compressed, may be in the act of expanding air will be drawn into it through the valve-seat, and when the bulb is next compressed such air will be forced out of it through the nozzle *a* and directly over the top of a jet-pipe, *d*, which forms part of the forked standard, and is extended down into the bottle.

In carrying out my invention I combine with the jet-pipe a small drip-cup, *e*, and a pipe, *f*, to lead therefrom down alongside of the jet-pipe, so as to open into the bottle, the opening from the drip-cup into the conduit *f* being shown at *g* in Fig. 3. Furthermore, I combine the valve-case and the nozzle with a pipe and a branch or support extending from the said pipe, whereby the elastic bulb is supported at opposite ends or parts, as shown.

It is well understood that when a stream of air is blown by the air-syringe across the top of the jet-pipe a column of liquid from the bottle will be raised through the jet-tube, and, as it may be discharged therefrom, will be broken up into fine spray or vapor.

More or less of the liquid will trickle down the outside of the jet-tube. The drip-cup and its conduit are to catch the surplus liquid and return it to the bottle. The nozzle of the air-syringe is fastened to the drip-cup, the valve-case being secured to the branch *k* of the forked standard. This arrangement not only supports the air-syringe to better advantage than one standard fastened to its nose only will, but enables its bulb to be removed as occasion may require, or a new one to be substituted. The valve-case supporting-branch projects from the jet-tube, or it and the cup-conduit, in manner as shown, and with them forms the furcated standard.

I claim—

1. In the atomizer, the combination of the drip-cup *e* and its conduit *f* with the jet-tube *d* and the air-syringe nozzle, all being substantially as described.

2. The combination of the valve-case *b*, nozzle *a*, jet-pipe *d*, and branch *k*, all arranged and for use with the bulb A and vessel D, substantially as set forth.

CHARLES P. JANES.

Witnesses:
R. H. EDDY,
J. R. SNOW.